United States Patent
Li et al.

(10) Patent No.: US 12,101,675 B2
(45) Date of Patent: Sep. 24, 2024

(54) CELL SELECTION METHOD, CELL RESELECTION METHOD, AND CHIP

(71) Applicant: Huawei Technologies Co., Ltd., Guangdong (CN)

(72) Inventors: Yong Li, Shanghai (CN); Zhiyuan Hou, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 333 days.

(21) Appl. No.: 17/594,493

(22) PCT Filed: Apr. 20, 2020

(86) PCT No.: PCT/CN2020/085554
§ 371 (c)(1),
(2) Date: Oct. 19, 2021

(87) PCT Pub. No.: WO2020/216167
PCT Pub. Date: Oct. 29, 2020

(65) Prior Publication Data
US 2022/0182904 A1     Jun. 9, 2022

(30) Foreign Application Priority Data

Apr. 26, 2019  (CN) .......................... 201910342104.3
Jul. 18, 2019  (CN) .......................... 201910651489.1

(51) Int. Cl.
*H04W 36/08*  (2009.01)
*H04W 36/00*  (2009.01)
*H04W 48/20*  (2009.01)

(52) U.S. Cl.
CPC ....... *H04W 36/08* (2013.01); *H04W 36/0085* (2018.08); *H04W 48/20* (2013.01)

(58) Field of Classification Search
CPC . H04W 36/08; H04W 36/0085; H04W 48/20; H04W 48/12; H04W 48/16;
(Continued)

(56) References Cited

U.S. PATENT DOCUMENTS

2012/0115459 A1   5/2012   Deng et al.
2012/0270537 A1   10/2012   Weng et al.
(Continued)

FOREIGN PATENT DOCUMENTS

CN   101222759 A   7/2008
CN   105519188 A   4/2016
(Continued)

OTHER PUBLICATIONS

3GPP TS 36.523-1 V16.0.0, Evolved Universal Terrestrial Radio Access (E-UTRA) and Evolved Packet Core (EPC); User Equipment (UE) conformance specification; Part 1: Protocol conformance specification, 627 pages.
(Continued)

*Primary Examiner* — Thai Nguyen
(74) *Attorney, Agent, or Firm* — WOMBLE BOND DICKINSON (US) LLP

(57) ABSTRACT

This application provides a cell selection method, a cell reselection method, and a chip, to improve user experience. The cell selection method includes: A terminal device searches for a first candidate cell, and receives a system message of the first candidate cell, where the system message includes parameter information of the first candidate cell and bandwidth information of the first candidate cell, and the bandwidth information is used to indicate a bandwidth of the first candidate cell. The terminal device determines a cell selection reception level value Srxlev and a cell selection quality value Squal of the first candidate cell based on cell measurement values and the parameter information (Continued)

of the first candidate cell, and determines that Srxlev>0 and Squal>0. When the bandwidth of the first candidate cell is greater than a preset threshold, the terminal device camps on the first candidate cell.

17 Claims, 8 Drawing Sheets

(58) Field of Classification Search
CPC ..... H04W 48/08; H04W 72/23; H04W 48/10; H04W 36/0083
See application file for complete search history.

(56) References Cited

U.S. PATENT DOCUMENTS

| | | | |
|---|---|---|---|
| 2014/0213256 A1* | 7/2014 | Meylan | H04W 48/18 455/436 |
| 2015/0282025 A1 | 10/2015 | Cui et al. | |
| 2016/0373978 A1* | 12/2016 | Pakniat | H04W 36/34 |
| 2017/0135005 A1 | 5/2017 | Basu Mallick et al. | |
| 2018/0035342 A1* | 2/2018 | Fujishiro | H04W 36/0085 |
| 2018/0132168 A1 | 5/2018 | Ingale et al. | |
| 2019/0098564 A1 | 3/2019 | Gupta et al. | |

FOREIGN PATENT DOCUMENTS

| | | | |
|---|---|---|---|
| CN | 108811008 A | 11/2018 | |
| WO | 2008112255 A2 | 9/2008 | |
| WO | WO-2008131401 A1 * | 10/2008 | .......... H04J 11/0069 |
| WO | WO-2018017840 A1 * | 1/2018 | ........... H04B 7/0617 |

OTHER PUBLICATIONS

3GPP TS 25.304 V15.0.0 (Jun. 2018), 3rd Generation Partnership Project; Technical Specification Group Radio Access Network; User Equipment (UE) procedures in idle mode and procedures for cell reselection in connected mode (Release 15), 58 pages.
3GPP TS 36.304 V15.3.0 (Mar. 2019), 3rd Generation Partnership Project; Technical Specification Group Radio Access Network; Evolved Universal Terrestrial Radio Access (E-UTRA); User Equipment (UE) procedures in idle mode (Release 15), 55 pages.
3GPP TS 38.304 V15.3.0 (Mar. 2019), 3rd Generation Partnership Project; Technical Specification Group Radio Access Network; NR; User Equipment (UE) procedures in Idle mode and RRC Inactive state (Release 15), 29 pages.

* cited by examiner

400

```
┌─────────────────────────────────────────────────────────────┐
│ A terminal device receives a system message of a serving    │
│ cell on which the terminal device camps, where the system   │
│ message includes neighboring cell information, and the      │──── S401
│ neighboring cell information includes priority information  │
│ and parameter information of a first candidate cell         │
└─────────────────────────────────────────────────────────────┘
                              │
                              ▼
┌─────────────────────────────────────────────────────────────┐
│ The terminal device determines, based on the priority       │
│ information and the parameter information of the first      │──── S402
│ candidate cell, that the first candidate cell satisfies a   │
│ cell reselection condition                                  │
└─────────────────────────────────────────────────────────────┘
                              │
                              ▼
┌─────────────────────────────────────────────────────────────┐
│ The terminal device receives a system message of the first  │
│ candidate cell, where the system message of the first       │
│ candidate cell includes bandwidth information of the first  │──── S403
│ candidate cell, and the bandwidth information is used to    │
│ indicate a bandwidth of the first candidate cell            │
└─────────────────────────────────────────────────────────────┘
                              │
                              ▼
┌─────────────────────────────────────────────────────────────┐
│ When the bandwidth of the first candidate cell is greater   │
│ than a preset threshold, the terminal device hands over     │──── S404
│ from the serving cell to the first candidate cell           │
└─────────────────────────────────────────────────────────────┘
```

FIG. 4

CELL SELECTION METHOD, CELL RESELECTION METHOD, AND CHIP

CROSS-REFERENCE TO RELATED APPLICATIONS

This application is a national stage of International Application No. PCT/CN2020/085554, filed on Apr. 20, 2020, which claims priority to Chinese Patent Application No. 201910342104.3, filed on Apr. 26, 2019 and entitled "CELL CAMPING METHOD", and claims priority to Chinese Patent Application No. 201910651489.1, filed on Jul. 18, 2019 and entitled "CELL SELECTION METHOD, CELL RESELECTION METHOD, AND CHIP". All of the aforementioned applications are incorporated herein by reference in their entireties.

TECHNICAL FIELD

This application relates to the communications field, and in particular, to a cell selection method, a cell reselection method, and a chip.

BACKGROUND

After a terminal device is powered on, the terminal device needs to perform public land mobile network (PLMN) selection and a cell selection procedure, and then camp on and perform registration in a selected cell, to enjoy a network service. Specifically, a non-access stratum (NAS) of the terminal device first performs public land mobile network (PLMN) selection. After a PLMN and a radio access technology (RAT) are selected, an access stratum (AS) of the terminal device performs the cell selection procedure. In the cell selection procedure, the terminal device searches for a cell that satisfies a preset condition, and camps on the selected cell. The cell selection condition mainly includes information such as cell parameter information and a cell measurement result. However, the information considered in the cell selection manner is not comprehensive. As a result, communication quality in the cell on which the terminal device camps is undesirable sometimes, leading to relatively poor user experience.

SUMMARY

This application provides a cell selection method, a cell reselection method, a terminal device, and a chip, to improve user experience.

According to a first aspect, a cell selection method is provided, including: A terminal device searches for a first candidate cell. The terminal device receives a system message of the first candidate cell. The system message of the first candidate cell includes parameter information of the first candidate cell; bandwidth information of the first candidate cell, where the bandwidth information is used to indicate a bandwidth of the first candidate cell; and information used to indicate the following content: a PLMN of the first candidate cell is a PLMN selected by a NAS, a PLMN of the first candidate cell is a registered PLMN, or a PLMN of the first candidate cell is a PLMN in an equivalent PLMN list; the first candidate cell is a cell that is not barred; and a TAI of the first candidate cell is not a TAI in a list of forbidden tracking areas for roaming. The terminal device determines a cell selection reception level value Srxlev and a cell selection quality value Squal of the first candidate cell based on cell measurement values and the parameter information of the first candidate cell, and determines that Srxlev>0 and Squal>0. When the bandwidth of the first candidate cell is greater than a preset threshold, the terminal device camps on the first candidate cell.

In an embodiment of the application, the terminal device considers a bandwidth factor of a cell in a cell selection process, so that when selecting a cell on which the terminal device is to camp, the terminal device can preferentially select a cell whose bandwidth is greater than the preset threshold. This can ensure that a case in which a data transmission rate is reduced due to a bandwidth is avoided, thereby improving user experience.

With reference to the first aspect, in an embodiment of the application, the method further includes: When the bandwidth of the first candidate cell is less than or equal to the preset threshold, the terminal device skips camping on the first candidate cell.

In an embodiment of the application, if the bandwidth of the candidate cell is less than or equal to the preset threshold, the terminal device skips camping on the candidate cell to continue to search for a cell whose bandwidth is greater than the preset threshold. This can ensure that a case in which a data transmission rate is reduced due to a bandwidth is avoided, thereby improving user experience.

With reference to the first aspect, in an embodiment of the application, the method further includes: When bandwidths of all candidate cells that satisfy a first preset condition and that are found by the terminal device are less than or equal to the preset threshold, the terminal device determines, from the candidate cells that satisfy the first preset condition, a cell on which the terminal device is to camp. The first preset condition includes: a PLMN of the candidate cell is a PLMN selected by the NAS, a PLMN of the candidate cell is a registered PLMN, or a PLMN of the candidate cell is a PLMN in the equivalent PLMN list; the candidate cell is a cell that is not barred; a TAI of the candidate cell is not a TAI in the list of forbidden tracking areas for roaming; and Srxlev>0 and Squal>0.

In an embodiment of the application, if the bandwidths of all the found candidate cells that satisfy the first preset condition are less than or equal to the preset threshold, the terminal device selects, from the found cells, a cell on which the terminal device is to camp. This ensures that the terminal device can smoothly camp on the cell, thereby improving user experience.

With reference to the first aspect, in an embodiment of the application, the method further includes: When the bandwidth of the first candidate cell is less than or equal to the preset threshold, the terminal device marks the first candidate cell as a cell with a lowest priority in a current radio access technology (RAT) or a cell with a lowest priority in all RATs supported by the terminal device.

In an embodiment of the application, the terminal device marks the cell whose bandwidth is less than or equal to the preset threshold as a cell with a lowest priority. In this way, in a subsequent cell reselection process, with reference to locally modified priority information, the terminal device can preferentially camp on a cell whose bandwidth is greater than the preset threshold, thereby improving user experience.

With reference to the first aspect, in an embodiment of the application, that a terminal device searches for a first candidate cell includes: When the terminal device locally stores a priori message, the terminal device searches for the first candidate cell based on the priori message, where the priori message is used to indicate cell information of a cell on which the terminal device has previously camped.

With reference to the first aspect, in an embodiment of the application, that a terminal device searches for a first candidate cell further includes: When the first candidate cell is not found based on the priori message, the terminal device determines the first candidate cell through a full-band search.

With reference to the first aspect, in an embodiment of the application, that a terminal device searches for a first candidate cell includes: When the terminal device does not locally store a priori message, the terminal device performs a full-band search for the first candidate cell, where the priori message is used to indicate cell information of a cell on which the terminal device has previously camped.

According to a second aspect, a cell reselection method is provided, including: A terminal device receives a system message of a serving cell on which the terminal device camps. The system message includes neighboring cell information, and the neighboring cell information includes priority information and parameter information of a first candidate cell. The terminal device determines, based on the priority information and the parameter information of the first candidate cell, that the first candidate cell satisfies a cell reselection condition. The terminal device receives a system message of the first candidate cell. The system message of the first candidate cell includes bandwidth information of the first candidate cell, and the bandwidth information is used to indicate a bandwidth of the first candidate cell. When the bandwidth of the first candidate cell is greater than a preset threshold, the terminal device hands over from the serving cell to the first candidate cell.

In an embodiment of the application, the terminal device considers a bandwidth factor of a cell in a cell reselection process, so that when selecting a cell on which the terminal device is to camp, the terminal device can preferentially select a cell whose bandwidth is greater than the preset threshold as the cell on which the terminal device is to camp. This can ensure that a case in which a data transmission rate is reduced due to a bandwidth is avoided, thereby improving user experience.

With reference to the second aspect, in an embodiment of the application, when the bandwidth of the first candidate cell is less than or equal to the preset threshold, the terminal device determines to continue to camp on the current serving cell.

In an embodiment of the application, in the cell reselection process, if the bandwidth of the candidate cell is less than or equal to the preset threshold, the terminal device does not hand over to the candidate cell. This can ensure that a case in which a data transmission rate is reduced due to a bandwidth is avoided, thereby improving user experience.

With reference to the second aspect, in an embodiment of the application, when the bandwidth of the first candidate cell is less than or equal to the preset threshold, the terminal device marks the first candidate cell as a barred cell.

In an embodiment of the application, the cell whose bandwidth is less than or equal to the preset threshold is marked as a barred cell. In this way, in the cell reselection process, the terminal device can be prevented from camping on a cell whose bandwidth does not satisfy the condition, thereby improving user experience.

With reference to the second aspect, in an embodiment of the application, that the terminal device determines, based on the priority information and the parameter information of the first candidate cell, that the first candidate cell satisfies a cell reselection condition includes: The terminal device determines, based on the priority information of the first candidate cell, that a priority of the first candidate cell is greater than that of the serving cell. The terminal device determines a cell selection reception level value Srxlev of the first candidate cell based on cell measurement values of the first candidate cell and the parameter information of the first candidate cell. The terminal device determines that Srxlev of the first candidate cell is greater than a first threshold within a preset time period. The terminal device determines that the terminal device has resided in the serving cell for more than one second.

With reference to the second aspect, in an embodiment of the application, that the terminal device determines, based on the priority information and the parameter information of the first candidate cell, that the first candidate cell satisfies a cell reselection condition includes: The terminal device determines, based on the priority information of the first candidate cell, that a priority of the first candidate cell is equal to that of the serving cell. The terminal device determines a cell-ranking criterion Rn for the first candidate cell based on the parameter information of the first candidate cell. The terminal device determines that Rn is greater than Rs, where Rs represents a cell-ranking criterion for the serving cell.

With reference to the second aspect, in an embodiment of the application, that the terminal device determines, based on the priority information and the parameter information of the first candidate cell, that the first candidate cell satisfies a cell reselection condition includes: The terminal device determines, based on the priority information of the first candidate cell, that a priority of the first candidate cell is less than that of the serving cell. The terminal device determines a cell selection reception level value Srxlev of the first candidate cell based on cell measurement values of the first candidate cell and the parameter information of the first candidate cell. The terminal device determines that within a preset time period, Srxlev of the first candidate cell is greater than a second threshold, and Srxlev of the serving cell is less than a third threshold. The terminal device determines that the terminal device has resided in the serving cell for more than one second.

According to a third aspect, a terminal device is provided. The terminal device has functions of implementing the method performed by the terminal device in the first aspect or the second aspect. These functions may be implemented by hardware, or may be implemented by hardware executing corresponding software. The hardware or software includes one or more units corresponding to the foregoing functions.

According to a fourth aspect, a chip is provided. The chip includes a processor. The processor is configured to invoke a computer program from a memory. When the computer program is executed, a terminal device installed with the chip is enabled to perform the method in the first aspect or the second aspect.

According to a fifth aspect, a communications apparatus is provided. The communications apparatus may be the terminal device in the foregoing method embodiments or a chip disposed in a terminal device. The communications apparatus includes a memory and a processor. The memory is configured to store computer-executable program code, and the processor is coupled to the memory. The program code stored in the memory includes instructions. When the processor executes the instructions, the communications apparatus is enabled to perform the method performed by the terminal device in the first aspect or the second aspect.

According to a sixth aspect, a computer program product is provided. The computer program product includes computer program code. When the computer program code is run on a computer, the computer is enabled to perform the method in the first aspect or the second aspect.

According to a seventh aspect, a computer-readable medium is provided. The computer-readable medium stores program code. When the computer program code is run on a computer, the computer is enabled to perform the method in the first aspect or the second aspect.

BRIEF DESCRIPTION OF DRAWINGS

FIG. 4 is a schematic flowchart of a cell reselection method according to an embodiment of this application;

DESCRIPTION OF EMBODIMENTS

The following describes technical solutions in this application with reference to the accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be an evolved NodeB (eNB, or eNodeB) in an LTE system, or may be a wireless controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
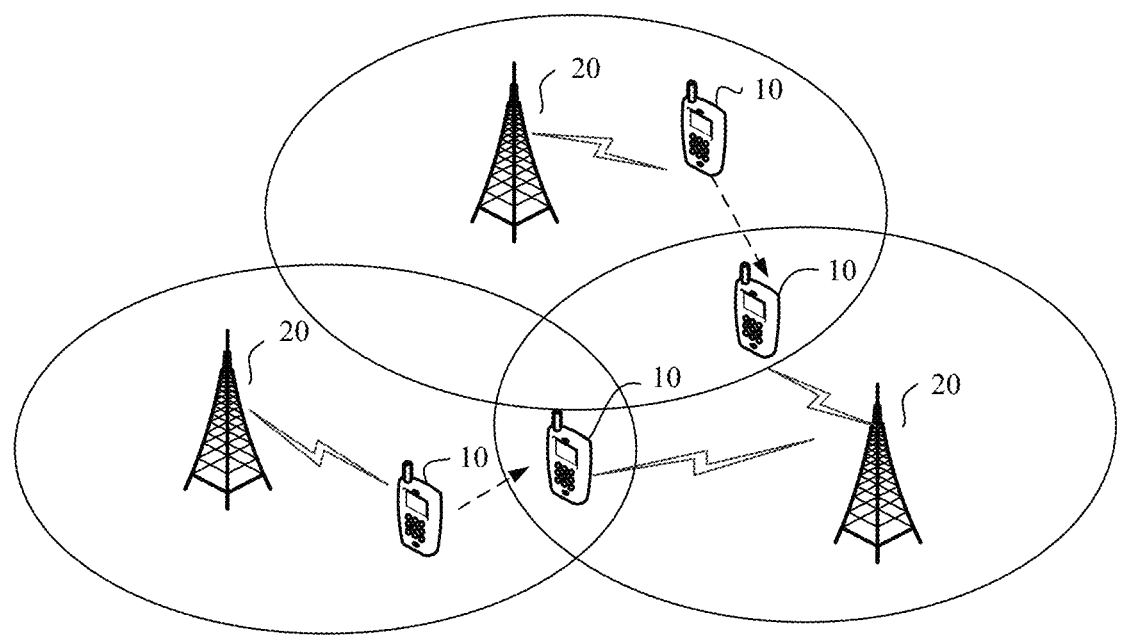
FIG. 1 is a schematic diagram of an application scenario according to an embodiment of this application.

FIG. 1 is a schematic diagram of a communication scenario according to an embodiment of this application. As shown in FIG. 1, the application scenario includes terminal devices 10 and network devices 20. The network device 20 may be an access network device, for example, a base station. There are one or more cells in a coverage area of each network device 20. When the terminal device 10 is moved into a coverage area of a cell, the terminal device 10 may perform cell selection or cell reselection. The cell selection refers to a process in which when accessing a network for the first time, the terminal device selects a cell that satisfies a preset condition and camps on the cell. For example, the cell selection may be performed when the terminal device is powered on or when the terminal device re-accesses the network after being disconnected from the network. Alternatively, the cell selection may be performed when the terminal device enters an idle state from a connected state. The cell reselection refers to a process in which the terminal device reselects and camps on a cell after the terminal device accesses a network and when there is a cell with better signal quality than a current serving cell. For example, the cell reselection may be performed when the terminal device is in an idle state.

In an existing cell selection process, when a terminal device is powered on or in another scenario, first, a NAS of the terminal device selects a PLMN, and selects a radio access technology (RAT) in the selected PLMN; and then an AS of the terminal device performs a cell search procedure, and determines whether a found cell satisfies a condition that allows the terminal device to camp on the cell. For example, in a conventional technology, whether a cell satisfies a condition that allows the terminal device to camp on the cell is determined based on the following content:

(1) A PLMN of the cell is a PLMN selected by the NAS, a PLMN of the cell is a registered PLMN, or a PLMN of the cell is a PLMN in an equivalent PLMN list.

(2) The cell is not a barred cell.

(3) A tracking area identity (TAI) of the cell is not a TAI in a list of forbidden tracking areas for roaming.

(4) The cell satisfies a cell selection criterion, where the cell selection criterion is that Srxlev>0 and Squal>0, Srxlev represents a cell selection reception (RX) level value (cell selection RX level value (dB)), and Squal represents a cell selection quality value (dB). For example, Srxlev and Squal may be respectively represented by using the following formulas:

$$\text{Srxlev} = Q_{rxlevmeas} - (Q_{rxlevmin} + Q_{rxlevminoffset}) - \text{Pcompensation} - \text{Qoffset}_{temp} \quad (1)$$

$$\text{Squal} = Q_{qualmeas} - (Q_{qualmin} + Q_{qualminoffset}) - \text{Qoffset}_{temp} \quad (2)$$

An LTE system is used as an example. The parameters used in the foregoing formulas may be listed in Table 1.

TABLE 1

| | |
|---|---|
| $Q_{rxlevmeas}$ | Measured cell reception level value (measured cell RX level value) |
| $Q_{qualmeas}$ | Measured cell quality value (measured cell quality value) |

TABLE 1-continued

| | |
|---|---|
| $Q_{rxlevmin}$ | Minimum required reception level in a cell (unit: decibel-milliwatt (dBm)) (minimum required RX level in a cell) |
| $Q_{qualmin}$ | Minimum required quality level in a cell (unit: decibel (dB)) (minimum required quality level in a cell) |
| $Q_{rxlevminoffset}$ | Offset to signalled $Q_{rxlevmin}$ taken into account in the Srxlev evaluation, where the offset to the signalled $Q_{rxlevmin}$ is taken into account in the Srxlev evaluation because a periodic search for a higher priority PLMN is needed during normal camping on a visited public land mobile network (VPLMN). |
| $Q_{qualminoffset}$ | Offset to signalled $Q_{qualmin}$ taken into account in the Squal evaluation, where the offset to the signalled $Q_{qualmin}$ is taken into account in the Squal evaluation because a periodic search for a higher priority PLMN is needed during normal camping on a VPLMN. |
| Pcompensation | If a terminal device supports additionalPmax (additional maximum transmit power) in an NS-PmaxList (a maximum power list sent on a network side), in a system information block (SIB): Pcompensation = max ($P_{EMAX1}$ − $P_{PowerClass}$, 0) − (min ($P_{EMAX2}$, $P_{PowerClass}$) − min ($P_{EMAX1}$, $P_{Powerclass}$)) (dB). If the terminal device does not support additionalPmax in the NS-PmaxList, and if a RAT is LTE, and $P_{PowerClass}$ is 14 dBm, Pcompensation = max ($P_{EMAX1}$ − ($P_{PowerClass}$ − $P_{offset}$), 0) (dB). If the foregoing conditions are not satisfied, Pcompensation = max ($P_{EMAX1}$ − $P_{PowerClass}$, 0) (dB). |
| $Qoffset_{temp}$ | Offset temporarily applied to a cell (unit: dB) (offset temporarily applied to a cell) |
| $P_{EMAX1}$, $P_{EMAX2}$ | A maximum transmit power level (dBm) that can be used by a terminal device when the terminal device performs sending on an uplink in a cell is defined as $P_{EMAX}$. $P_{EMAX1}$ and $P_{EMAX2}$ are obtained from p-Max (maximum transmit power) and an NS-PmaxList. |
| $P_{PowerClass}$ | Maximum radio frequency (RF) output power (unit: dBm) of a terminal device based on a power class of the terminal device |

In some examples, $Q_{rxlevmeas}$ may be a reference signal received power (RSRP), and $Q_{qualmeas}$ may be reference signal received quality (RSRQ).

In an embodiment of this application, the measured cell reception level value $Q_{rxlevmeas}$ and the measured cell selection quality value $Q_{qualmeas}$ may also be collectively referred to as cell measurement values. Other parameters in Formula (1) and Formula (2) may be obtained from a system message.

In the cell selection process, after successfully camping on a cell, the terminal device searches for a cell with better signal quality according to cell reselection criteria. For example, based on priority information configured on a network side, the cell reselection criteria may be divided into criteria corresponding to the following three scenarios (a) to (c).

Scenario (a): If a priority of a target cell is higher than that of a serving cell, a condition for triggering cell reselection is as follows:

(1) Srxlev of the target cell is greater than a first threshold within a preset time period.

(2) The terminal device has resided in the serving cell for more than one second.

Srxlev represents a cell selection reception (RX) level value, and the first threshold represents a threshold condition that Srxlev needs to satisfy when the terminal device reselects a RAT/frequency with a higher priority than a current serving frequency. For example, the first threshold may be represented as $Thresh_{X, High}$, and its unit may be decibel (dB). Optionally, a length of the preset time period may be defined according to a standard, and the preset time period may be represented as $Treselection_{RAT}$. The length of the preset time period may vary in different cases. For example, a length of the preset time period when frequencies of a candidate cell and the serving cell are the same may be different from a length of the preset time period when the frequencies of the candidate cell and the serving cell are different.

Scenario (b): If the priority of the target cell is the same as that of the serving cell, the condition for triggering cell reselection is as follows:

Rn for the target cell is greater than Rs within a preset time period.

The cell reselection condition in this scenario may be referred to as a cell-ranking criterion, or may be referred to as an R criterion for short. Rs and Rn respectively represent a cell-ranking criterion for the serving cell and a cell-ranking criterion for a candidate cell. In an example, Rs and Rn may be respectively represented by using the following formulas:

$$Rs = Q_{meas,s} + Q_{hyst} - Qoffset_{temp} \quad (3)$$

$$Rn = Q_{meas,n} - Qoffset - Qoffset_{temp} \quad (4)$$

$Q_{meas,s}$ and $Q_{meas,n}$ respectively represent reference signal received power(RSRP) measurement quality used by the serving cell and the candidate cell in cell selection, and $Q_{hyst}$ represents a hysteresis value of a cell-ranking criterion. Qoffset represents a cell offset, and $Qoffset_{temp}$ represents an offset temporarily applied to a cell. In an embodiment of this application, the parameters used in Formula (3) and Formula (4) may be obtained from a system message.

Scenario (c): If the priority of the target cell is lower than that of the serving cell, the condition for triggering cell reselection is as follows:

(1) Within a preset time period, Srxlev of the target cell is greater than a second threshold, and Srxlev of the serving cell is less than a third threshold.

(2) The terminal device has resided in the serving cell for more than one second.

Srxlev represents a cell selection RX level value, and the second threshold and the third threshold respectively represent threshold conditions that Srxlev of the target cell and Srxlev of the serving cell need to satisfy when the terminal device reselects a RAT/frequency with a lower priority than a current serving frequency. For example, the second threshold may be referred to as $Thresh_{Serving, LowP}$, and the third threshold may be referred to as $Thresh_{X, LowP}$, and their units may be dB. Optionally, a length of the preset time period may be defined according to a standard, and the preset time period may be represented as $Treselection_{RAT}$. The length of the preset time period may vary in different cases. For example, a length of the preset time period when frequencies of a candidate cell and the serving cell are the same may be different from a length of the preset time period when the frequencies of the candidate cell and the serving cell are different.

In an embodiment of this application, the foregoing cell reselection conditions are not limited to those in the foregoing examples, and several conditions may be added or removed based on the cell reselection conditions in the foregoing examples. Optionally, in the scenario (a) and the scenario (c), Squal may alternatively be used to replace Srxlev as a cell reselection determining condition.

Parameters used for calculating the cell selection and cell reselection criteria are from cell parameters and cell measurement values, and mainly depend on cell priority information and measurement values, without considering a bandwidth limitation of a cell. Therefore, the terminal device may select and camp on a narrowband cell. In this case, even if signal quality of a cell is relatively desirable, a data transmission rate of the terminal device is relatively low due to a bandwidth limitation, affecting user experience. For example, the data transmission rate may be only a few thousand bits per second (Kbps) or tens of Kbps.

To resolve the foregoing problem, this application provides solutions for cell selection and cell reselection. In the solutions, bandwidth information of a cell is considered in cell selection and cell reselection processes, so that a terminal device camps on a cell with a relatively high data transmission rate, thereby improving user experience.

Figure 2:
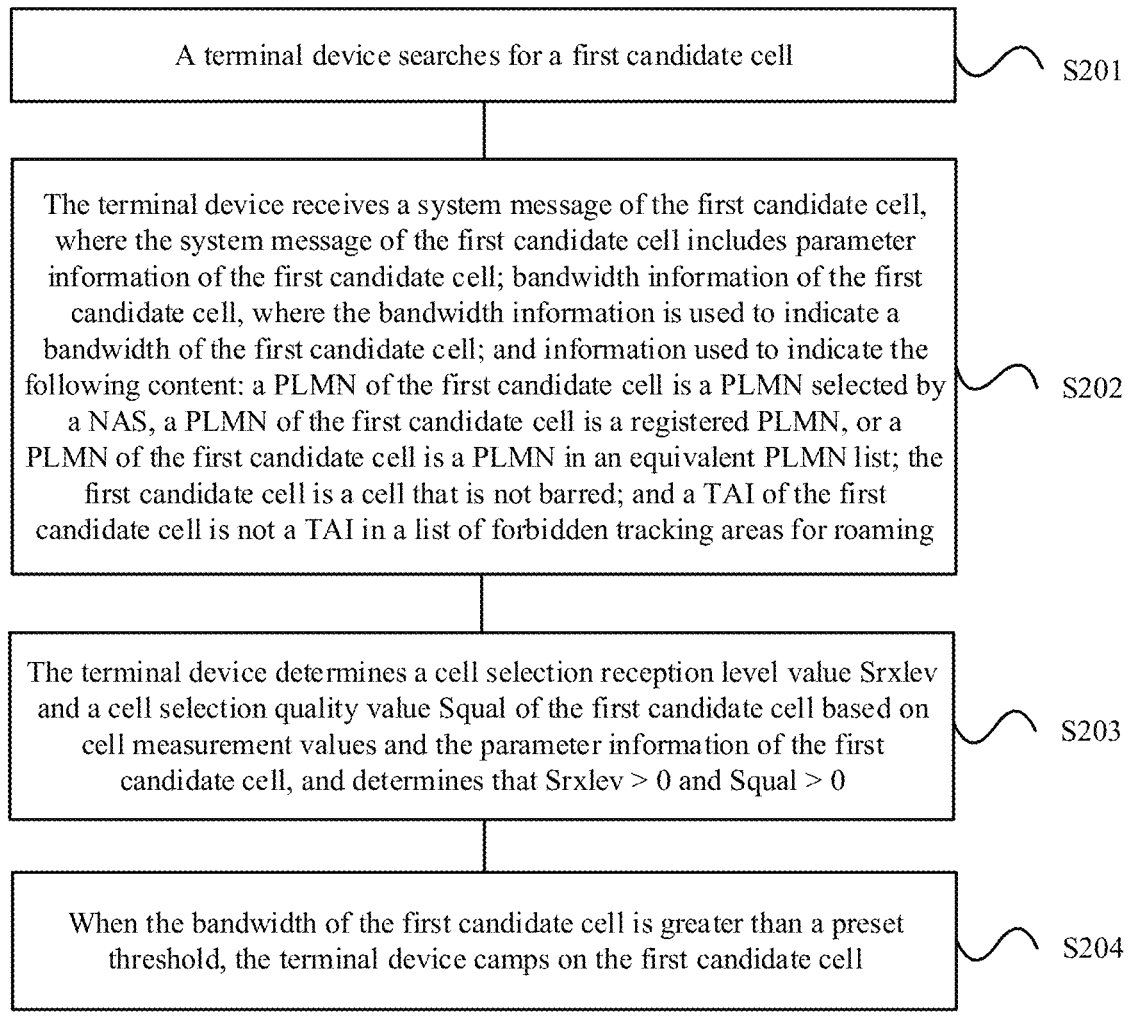
FIG. 2 is a schematic flowchart of a cell selection method according to an embodiment of this application.

FIG. 2 is a schematic flowchart of a cell selection method according to an embodiment of this application. As shown in FIG. 2, specific content of the method 200 includes the following operations.

S201: A terminal device searches for a first candidate cell.

In an embodiment of this application, the terminal device searches for the first candidate cell according to a cell selection procedure. Optionally, a candidate cell in this embodiment of this application may also be referred to as a suitable cell.

In an embodiment of the application, there may be two manners for the cell selection procedure. One manner is referred to as a stored information cell selection procedure, and means that the terminal device performs a search based on priori information when having stored the priori information. The priori information is used to indicate cell information of a cell on which the terminal device has previously camped, for example, frequency information, a carrier frequency, and a cell parameter. For example, the terminal device may perform cell synchronization based on the cell frequency information in the priori information, and obtain a system message of a cell after the cell synchronization. The terminal device may perform a search only in a cell whose cell information is stored. Then, the terminal device determines whether a found cell satisfies a preset condition; and if the found cell satisfies the preset condition, determines whether to camp on the cell; or if the found cell does not satisfy the preset condition, continues to perform the cell selection procedure. The other manner is referred to as an initial cell selection procedure, and means that the terminal device performs a full-band search when the terminal device does not store priori information. The terminal device may perform the full-band search based on a capability and a configuration of the terminal device.

In an embodiment of the application, in some specific examples, before performing S201, a NAS of the terminal device may perform a PLMN selection procedure, and select a PLMN. PLMN selection may also be referred to as network selection. For example, the terminal device may maintain a PLMN list, and select the PLMN from the PLMN list based on a priority order. After the PLMN is selected, the NAS of the terminal device may indicate, to an AS, a radio access technology (RAT) related to the selected PLMN, and indicate the AS of the terminal device to perform the cell selection procedure.

S202: The terminal device receives a system message of the first candidate cell, where the system message of the first candidate cell includes parameter information of the first candidate cell; bandwidth information of the first candidate cell, where the bandwidth information is used to indicate a bandwidth of the first candidate cell; and information used to indicate the following content: a PLMN of the first candidate cell is a PLMN selected by the NAS, a PLMN of the first candidate cell is a registered PLMN, or a PLMN of the first candidate cell is a PLMN in an equivalent PLMN list; the first candidate cell is a cell that is not barred; and a TAI of the first candidate cell is not a tracking area identity (TAI) in a list of forbidden tracking areas for roaming.

In an embodiment of the application, an LTE system is used as an example. The bandwidth information may be dl-Bandwidth information in a master information block (MIB) message in the system message. For example, in a communication protocol, dl-Bandwidth information may be represented as follows:

| MasterInformationBlock ::= | SQUENCE{ |
|---|---|
| dl-Bandwidth | ENUMERATED{ |
|  | n6, n15, n25, n50, |
| n75, ...} |  |
|  | ... |
| } |  |

SQUENCE represents a sequence, and ENUMERATED represents enumeration. n6, n15, n25, n50, n75, and the like are used to indicate different bandwidths.

In an embodiment of the application, an LTE system is used as an example. plmn-IdentityList information in a system information block type 1 (SIB 1) message may be used to indicate a PLMN of a cell. trackingAreaCode (tracking area code) in the SIB 1 message may be used to indicate whether a TAI of the cell is in a list of forbidden tracking areas for roaming, and cellBarred (barred cell) information in the SIB 1 message is used to indicate whether the cell is a barred cell. In a communication protocol, the SIB 1 information may be represented as follows:

| SystemInformationBlockType1 ::= | SQUENCE{ |
|---|---|
|  | ... |
| plmn-IdentityList | PLMN-Identitylist, |
| trackingAreaCode | trackingAreaCode, |
| cellBarred | ENUMERATED{ |
|  | Barred, notBarred} |
|  | ... |
| } |  |

In an embodiment of the application, the parameter information of the first candidate cell may include parameters used to calculate a cell selection reception level value Srxlev and a cell selection quality value Squal. The parameter information may also be carried in the SIB 1 information. For example, the SIB 1 information may include a parameter $Q_{rxlevmin}$ (q-RxLevMin) and a parameter $Q_{rxlevminoffset}$ (q-RxLevMinOffset).

A person skilled in the art can understand that the foregoing descriptions of the information are merely used as examples. The system message may alternatively carry the information at other locations. This is not limited in this embodiment of this application.

S203: The terminal device determines the cell selection reception level value Srxlev and the cell selection quality value Squal of the first candidate cell based on cell measurement values and the parameter information of the first candidate cell, and determines that Srxlev>0 and Squal>0.

In an embodiment of the application, the terminal device may determine, based on the system message included in the first candidate cell, whether the first candidate cell satisfies a cell selection condition. In an embodiment of the application, the condition may be referred to as a first preset condition. The first preset condition may include the following content:

(1) The PLMN of the first candidate cell is a PLMN selected by the NAS, the PLMN of the first candidate cell is a registered PLMN, or the PLMN of the first candidate cell is a PLMN in the equivalent PLMN list.

(2) The first candidate cell is not a barred cell.

(3) The TAI of the first candidate cell is not a TAI in the list of forbidden tracking areas for roaming (forbidden tracking areas for roaming).

(4) The first candidate cell satisfies a cell selection criterion, and the cell selection criterion is that Srxlev>0 and Squal>0, where Srxlev represents a cell selection reception (RX) level value, and Squal represents a cell selection quality value.

Based on the information in S202, the first candidate cell has satisfied the conditions (1) to (3). In S203, the terminal device may determine the cell selection reception level value Srxlev and the cell selection quality value Squal based on the cell measurement values and the parameter information of the first candidate cell, and determine that the cell selection reception level value Srxlev and the cell selection quality value Squal satisfy a requirement of the condition (4).

The cell measurement values may include a measured cell reception level value $Q_{rxlevmeas}$ and a measured cell selection quality value $Q_{qualmeas}$ For a specific manner of determining the cell selection reception level value Srxlev and the cell selection quality value Squal, refer to the foregoing descriptions about Formula (1) and Formula (2). Details are not described herein again.

S204: When the bandwidth of the first candidate cell is greater than a preset threshold, the terminal device camps on the first candidate cell.

In an embodiment of the application, on the basis that the first candidate cell satisfies the first preset condition, the terminal device further needs to determine whether the bandwidth of the first candidate cell is greater than the preset threshold; and the terminal device determines to camp on the first candidate cell, only when the bandwidth of the first candidate cell is greater than the preset threshold. The terminal device may determine the bandwidth of the first candidate cell based on the bandwidth information obtained in S202.

In an embodiment of the application, in the cell selection process, the terminal device selects the cell whose bandwidth is greater than the preset threshold as a cell on which the terminal device is to camp. This can ensure that a case in which a data transmission rate is reduced due to a bandwidth is avoided, thereby improving user experience.

In an embodiment of the application, the preset threshold is not limited, and the preset threshold may be set based on communication practice. For example, the preset threshold may be set to make a data transmission rate greater than a preset value when a bandwidth of a cell is greater than the preset threshold.

In an embodiment of the application, in addition to comparison between the bandwidth and the preset threshold, the terminal device may determine, in another manner, whether the bandwidth of the first candidate cell satisfies a condition that allows the terminal device to camp on the cell. For example, a bandwidth of a cell may correspond to a bandwidth level. For example, bandwidth levels may be divided into a level 1, a level 2, a level 3, a level 4, and the like according to an ascending order of bandwidths. The terminal device may determine, based on a bandwidth level corresponding to the bandwidth of the first candidate cell, whether to camp on the first candidate cell. For example, when the bandwidth level of the first candidate cell is greater than or equal to the level 3, the terminal device determines to camp on the first candidate cell.

In some examples, when the bandwidth of the first candidate cell is less than or equal to the preset threshold, the terminal device determines not to camp on the first candidate cell. Further, the terminal device may continue to search for another candidate cell that satisfies the first preset condition, and if a bandwidth of a found second candidate cell is greater than the preset threshold, the terminal device camps on the second candidate cell.

In an embodiment of the application, if the bandwidth of the candidate cell is less than or equal to the preset threshold, the terminal device continues to search for another cell until a cell whose bandwidth satisfies the condition is found. This can ensure that a case in which a data transmission rate is reduced due to a bandwidth is avoided, thereby improving user experience.

In some examples, when bandwidths of all candidate cells that satisfy the first preset condition and that are found by the terminal device are less than or equal to the preset threshold, the terminal device determines, from the candidate cells that satisfy the first preset condition, a cell on which the terminal device is to camp. The candidate cells that satisfy the first preset condition include the first candidate cell.

For example, when the bandwidth of the first candidate cell is less than or equal to the preset threshold, the terminal device may not camp on the first candidate cell temporarily, and continue to search for another candidate cell; and if bandwidths of all found candidate cells are less than or equal to the preset threshold, the terminal device selects any cell from the found candidate cells, and camps on the cell. In addition, the terminal device may enable a periodic search to search for a cell whose bandwidth is greater than the preset threshold, and if a cell that satisfies the condition is found, the terminal device may perform a handover between cells in a cell reselection procedure. Alternatively, the terminal device may determine, in another equivalent or changed manner, whether a bandwidth of a cell satisfies a condition that allows the terminal device to camp on the cell. This is not limited in this embodiment of this application.

In an embodiment of the application, if none of the bandwidths of the found candidate cells satisfies the preset condition, the terminal device selects, from the found cells that satisfy the first preset condition, a cell on which the terminal device is to camp. This ensures that the terminal device can smoothly camp on a cell, thereby improving user experience.

In an embodiment of the application, when the bandwidth of the first candidate cell is less than or equal to the preset threshold, the terminal device marks the first candidate cell as a cell with a lowest priority in a current RAT or a cell with a lowest priority in all RATs supported by the terminal device. The current RAT is a RAT corresponding to a cell on which the terminal device currently camps. Generally, one PLMN may support a plurality of RATs. For example, China Mobile may support GSM, time division-synchronous code division multiple access (TD-SCDMA), and LTE.

For example, the terminal device may obtain priority information of the first candidate cell from the system message. In an embodiment of the application, priorities of cells in ascending order may be represented by numbers 0 to 7. If the bandwidth of the first candidate cell is less than or equal to the preset threshold, the terminal device may locally modify the priority information of the first candidate cell, and modify the first candidate cell to a cell with a lowest priority in the current RAT, or mark the first candidate cell as a cell with a lowest priority in all the RATs supported by the terminal device. For example, a lowest priority in an LTE standard is 5. If a priority of the first candidate cell is to be modified in the current RAT, the priority of the first candidate cell may be modified to 5. If the priority of the first candidate cell is to be modified in all the RATs, the priority of the first candidate cell may be modified to 0. After the priority is modified, the terminal device may perform a subsequent cell reselection process with reference to locally modified priority information.

In an embodiment of the application, the terminal device locally marks the cell whose bandwidth is less than or equal to the preset threshold as a cell with a lowest priority. In this way, in the subsequent cell reselection process, the terminal device can preferentially camp on a cell whose bandwidth is greater than the preset threshold, thereby improving user experience.

In an embodiment of the application, when the terminal device locally stores a priori message, the terminal device searches for the first candidate cell based on the priori message, where the priori message is used to indicate cell information of a cell on which the terminal device has previously camped. In some examples, when the terminal device does not locally store a priori message, the terminal device performs a full-band search for the first candidate cell, where the priori message is used to indicate cell information of a cell on which the terminal device has previously camped.

In an embodiment of the application, when the terminal device does not locally store a priori message, the terminal device performs a full-band search for the first candidate cell, where the priori message is used to indicate cell information of a cell on which the terminal device has previously camped.

In an example of the cell selection method, it is assumed that the terminal device is located in coverage areas of a first cell A and a second cell B and both the first cell A and the second cell B satisfy the first preset condition. A bandwidth of the first cell A is less than the preset threshold, and a bandwidth of the second cell B is greater than the preset threshold. In this case, according to a cell selection procedure in a conventional technology, if the terminal device first finds the first cell A, the terminal device chooses to camp on the first cell A without considering a bandwidth factor. Due to a bandwidth limitation, a data transmission rate of the terminal device is far lower than a data transmission rate expected by a user, resulting in relatively poor user experience. By contrast, in this embodiment of this application, if the terminal device first finds the first cell A in the cell selection procedure, because the bandwidth of the first cell A is less than the preset threshold, the terminal device does not camp on the first cell A, but continues to search for another candidate cell that satisfies the first preset condition, until the second cell B is found. Because the bandwidth of the second cell B is greater than the preset threshold, the terminal device finally camps on the second cell B. This ensures the data transmission rate of the terminal device, thereby improving user experience.

Figure 3:
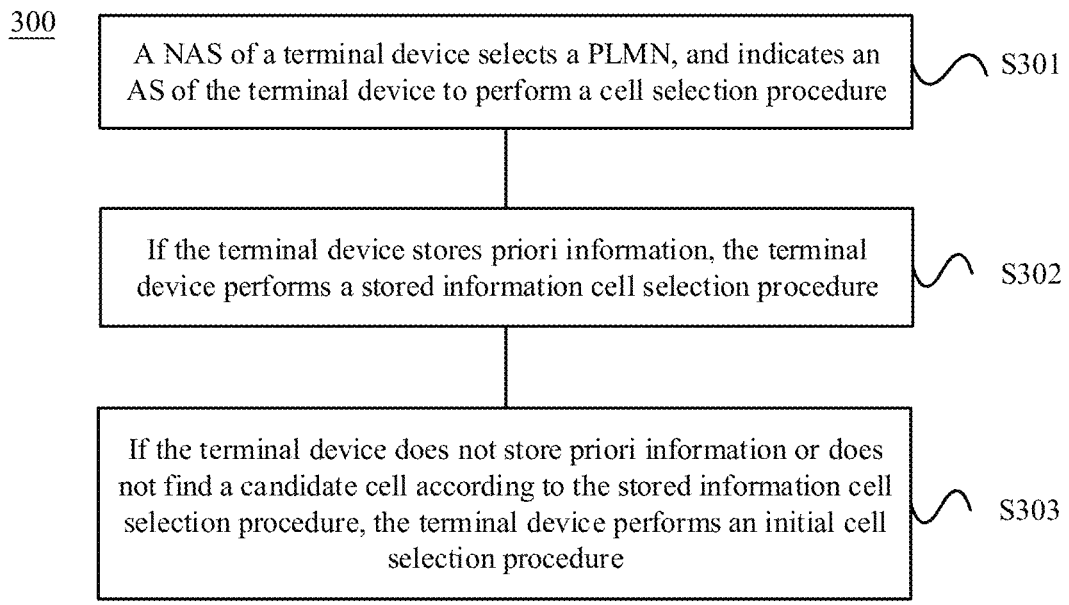
FIG. 3 is a schematic flowchart of a cell selection method according to another embodiment of this application.

FIG. 3 is a schematic diagram of a cell selection method according to another embodiment of this application. As shown in FIG. 3, the cell selection method 300 includes the following content.

S301: A NAS of a terminal device selects a PLMN, and indicates an AS of the terminal device to perform a cell selection procedure.

In an embodiment of the application, for specific content of the cell selection procedure, refer to the related descriptions in FIG. 2. Details are not described herein again.

S302: If the terminal device stores priori information, the terminal device performs a stored information cell selection procedure.

For example, if the terminal device finds a candidate cell that satisfies a first preset condition, the terminal device determines whether a bandwidth of the candidate cell is greater than a preset threshold. If the bandwidth of the candidate cell is greater than the preset threshold, the terminal device camps on the candidate cell. If the bandwidth of the candidate cell is less than or equal to the preset threshold, the terminal device may mark the candidate cell as a cell with a lowest priority in a current RAT or a cell with a lowest priority in all RATs; and then the terminal device continues to perform the stored information cell selection procedure. If bandwidths of all candidate cells found by the terminal device are less than the preset threshold, the terminal device may select a cell from the found candidate cells as a cell on which the terminal device is to camp.

In an embodiment of the application, if the terminal device does not find a candidate cell that satisfies the preset condition by performing the stored information cell selection procedure, the terminal device may continue to perform S303.

S303: If the terminal device does not store priori information or does not find a candidate cell according to the stored information cell selection procedure, the terminal device performs an initial cell selection procedure.

In a specific example, the terminal device may perform a full-band search for a candidate cell that satisfies the first preset condition. If a bandwidth of the candidate cell is greater than the preset threshold, the terminal device camps on the candidate cell. If the bandwidth of the candidate cell is less than or equal to the preset threshold, the terminal device may mark the candidate cell as a cell with a lowest priority in the current RAT or a cell with a lowest priority in all the RATs; and then the terminal device continues to perform the initial cell selection procedure. If bandwidths of all candidate cells found by the terminal device are less than the preset threshold, the terminal device may select, from the found candidate cells that satisfy the first preset condition, a cell as a cell on which the terminal device is to camp. In addition, the terminal device may enable a periodic search, where the periodic search is used to search for a cell whose bandwidth is greater than the preset threshold.

In a specific example, if the terminal device does not find a candidate cell according to the initial cell selection procedure, the terminal device performs any cell search (any cell search) procedure. The any cell search procedure is a process in which the terminal device attempts to camp on a restricted cell when the terminal device cannot obtain a normal service. A serving cell on which the terminal device camps according to the any cell search procedure provides only an emergency service. The cell on which the terminal device camps further needs to satisfy the following conditions: (1) The cell is not a barred cell; and (2) the cell satisfies a basic cell camping criterion. Alternatively, the terminal device may report a search failure, and trigger a network selection procedure again.

The following describes a cell reselection method 400 in an embodiment of this application with reference to FIG. 4. The method 400 includes the following content.

S401: A terminal device receives a system message of a serving cell on which the terminal device camps, where the system message includes neighboring cell information, and the neighboring cell information includes priority information and parameter information of a first candidate cell.

The parameter information of the first candidate cell may include a parameter used to determine whether the cell satisfies a cell reselection condition. For example, in the foregoing scenario (a) and scenario (c) corresponding to the cell reselection criteria, the parameter information may include a parameter required for calculating Srxlev or Squal. In the scenario (b) corresponding to the cell reselection criterion, the parameter information may include parameters required for calculating Rs and Rn, and the like.

For example, in an LTE system, the neighboring cell information may be located in system information block type 4 (SIB4) information, system information block type 5 (SIB5) information, and/or system information block type 6 (SIB6) information in the system message.

S402: The terminal device determines, based on the priority information and the parameter information of the first candidate cell, that the first candidate cell satisfies a cell reselection condition.

For example, the terminal device may compare, based on the priority information of the first candidate cell, a priority of the first candidate cell with a priority of the cell on which the terminal device currently camps, to determine that a current scenario is which one of the scenarios (a) to (c) corresponding to the cell reselection criteria. Then, the terminal device further determines, based on a cell measurement result and the parameter information, whether the first candidate cell satisfies the cell reselection condition.

For specific content of the cell reselection criteria corresponding to the foregoing scenarios (a) to (c), refer to the foregoing related descriptions. For brevity, details are not described herein again.

S403: The terminal device receives a system message of the first candidate cell, where the system message of the first candidate cell includes bandwidth information of the first candidate cell, and the bandwidth information is used to indicate a bandwidth of the first candidate cell.

For example, the terminal device may obtain frequency information of the first candidate cell based on the neighboring cell information, perform cell synchronization with the first candidate cell based on the frequency information of the first candidate cell, and then receive the system message of the first candidate cell. For example, in an LTE system, the bandwidth information may be dl-Bandwidth (bandwidth) information in a master information block (MIB) message in the system message.

S404: When the bandwidth of the first candidate cell is greater than a preset threshold, the terminal device hands over from the serving cell to the first candidate cell.

In an embodiment of the application, the serving cell on which the terminal device currently camps may also be referred to as a source cell, and the first candidate cell may also be referred to as a suitable cell. When the terminal device determines to hand over to the first candidate cell, the first candidate cell may be referred to as a target cell.

In an embodiment of the application, on the basis that the first candidate cell satisfies the cell reselection condition, the terminal device further needs to determine whether the bandwidth of the first candidate cell is greater than the preset threshold; and the terminal device determines to hand over to the first candidate cell, only when the bandwidth of the first candidate cell is greater than the preset threshold. The terminal device may determine the bandwidth of the first candidate cell based on the bandwidth information obtained in S403.

In an embodiment of the application, in the cell reselection process, the terminal device chooses to hand over to the cell whose bandwidth is greater than the preset threshold. This can ensure that a case in which a data transmission rate is reduced due to a bandwidth is avoided, thereby improving user experience.

In some examples, when the bandwidth of the first candidate cell is less than or equal to the preset threshold, the terminal device determines to continue to camp on the current serving cell.

In some examples, when the bandwidth of the first candidate cell is less than or equal to the preset threshold, the terminal device may locally mark the first candidate cell as a barred cell. After the first candidate cell is marked as a barred cell, the terminal device is forbidden to camp on the first candidate cell within a preset time period. A length of the preset time period may be determined based on practice. This is not limited in this embodiment of this application.

For example, when the bandwidth of the first candidate cell is less than or equal to the preset threshold, the terminal device may add the first candidate cell to a cell barred list for a limited bandwidth to forbid the terminal device to camp on the first candidate cell, and then the terminal device ends the cell reselection procedure. Alternatively, the terminal device may not process the first candidate cell, but may determine that the cell reselection fails, and continue to camp on the current serving cell.

In an example of the cell reselection method, it is assumed that the terminal device currently camps on a second cell B and a first cell A is a neighboring cell of the cell in which the terminal device is located. Based on the system message, it can be learned that a priority of the first cell A is higher than that of the second cell B and the first cell A satisfies a cell reselection condition in a conventional technology (for details, refer to the foregoing scenario (a) corresponding to the cell reselection criterion). A bandwidth of the first cell A is less than the preset threshold, and a bandwidth of the second cell B is greater than the preset threshold. If the terminal device selects a cell according to an existing cell reselection solution, the terminal device hands over to the first cell A. Due to a bandwidth limitation, a data transmission rate of the terminal device is far lower than a data transmission rate expected by a user, resulting in relatively poor user experience. By contrast, in this embodiment of this application, because the bandwidth of the first cell A is less than the preset threshold, the terminal device does not hand over to the first cell A, but continues to camp on the second cell B.

In addition, if the terminal device finds the first cell A in a previous cell selection or cell reselection process, the terminal device locally marks the first cell A as a cell with a lowest priority. Therefore, the first cell A is not preferentially considered in the cell reselection process. This ensures the data transmission rate of the terminal device, thereby improving user experience.

Figure 5:
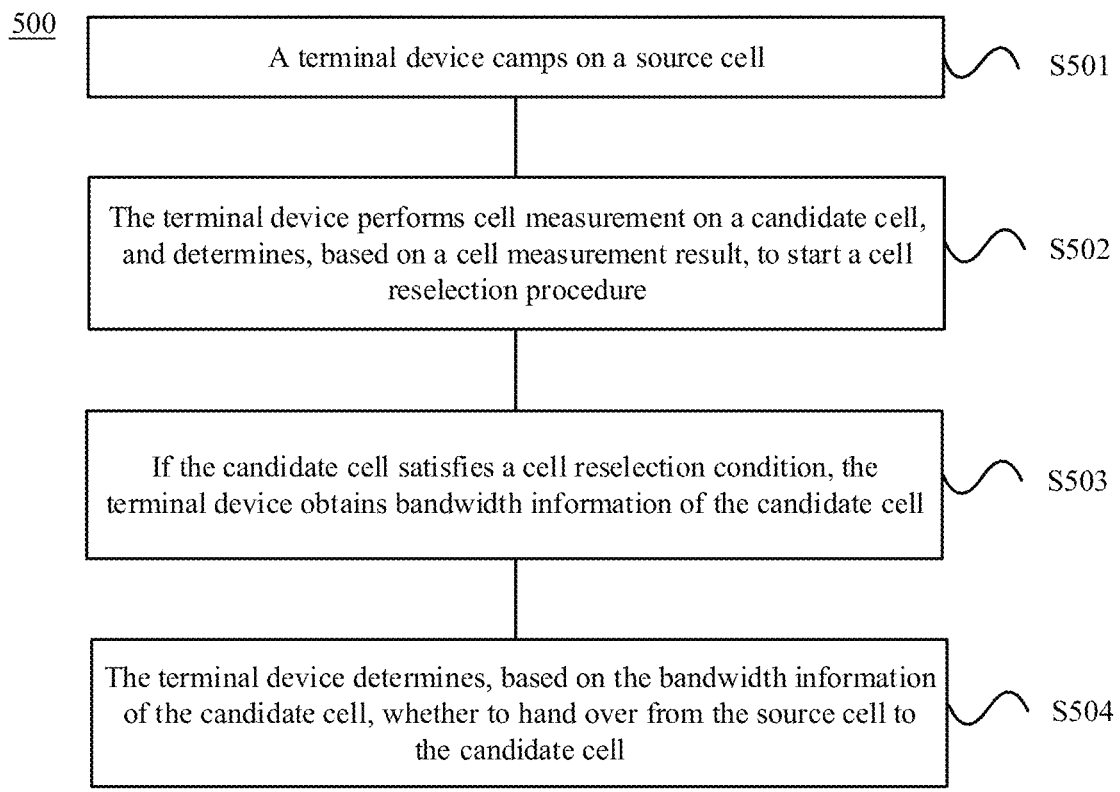
FIG. 5 is a schematic flowchart of a cell selection method according to another embodiment of this application.

FIG. 5 is a schematic flowchart of a cell reselection method according to another embodiment of this application. As shown in FIG. 5, a procedure of the cell reselection method 500 is as follows:

S501: A terminal device camps on a source cell.

S502: The terminal device performs cell measurement on a candidate cell, and determines, based on a cell measurement result, to start a cell reselection procedure.

S503: If the candidate cell satisfies a cell reselection condition, the terminal device obtains bandwidth information of the candidate cell.

The cell reselection condition is described above, and details are not described herein again.

In an embodiment of the application, the terminal device may determine whether the terminal device stores the bandwidth information of the candidate cell. If the terminal device does not store the bandwidth information of the candidate cell, the terminal device may obtain the bandwidth information of the candidate cell by receiving a system message of the candidate cell. The system message of the candidate cell includes the bandwidth information.

In an embodiment of this application, if the candidate cell does not satisfy the cell reselection condition, the terminal device continues to perform cell measurement and the cell reselection procedure.

S504: The terminal device determines, based on the bandwidth information of the candidate cell, whether to hand over from the source cell to the candidate cell.

For example, if a bandwidth of the candidate cell is greater than a preset threshold, the terminal device hands over from the source cell to the candidate cell.

For example, if the bandwidth of the candidate cell is less than or equal to the preset threshold, the terminal device camps on the source cell. In an embodiment of this application, the terminal device may add the candidate cell to a cell barred list for a limited bandwidth, and end the cell reselection procedure. In this case, the terminal device is forbidden to camp on the candidate cell within a period of time. Alternatively, the terminal device may not perform any special processing on the candidate cell, but may determine that the cell reselection fails, and continue to camp on the source cell.

Figure 6:
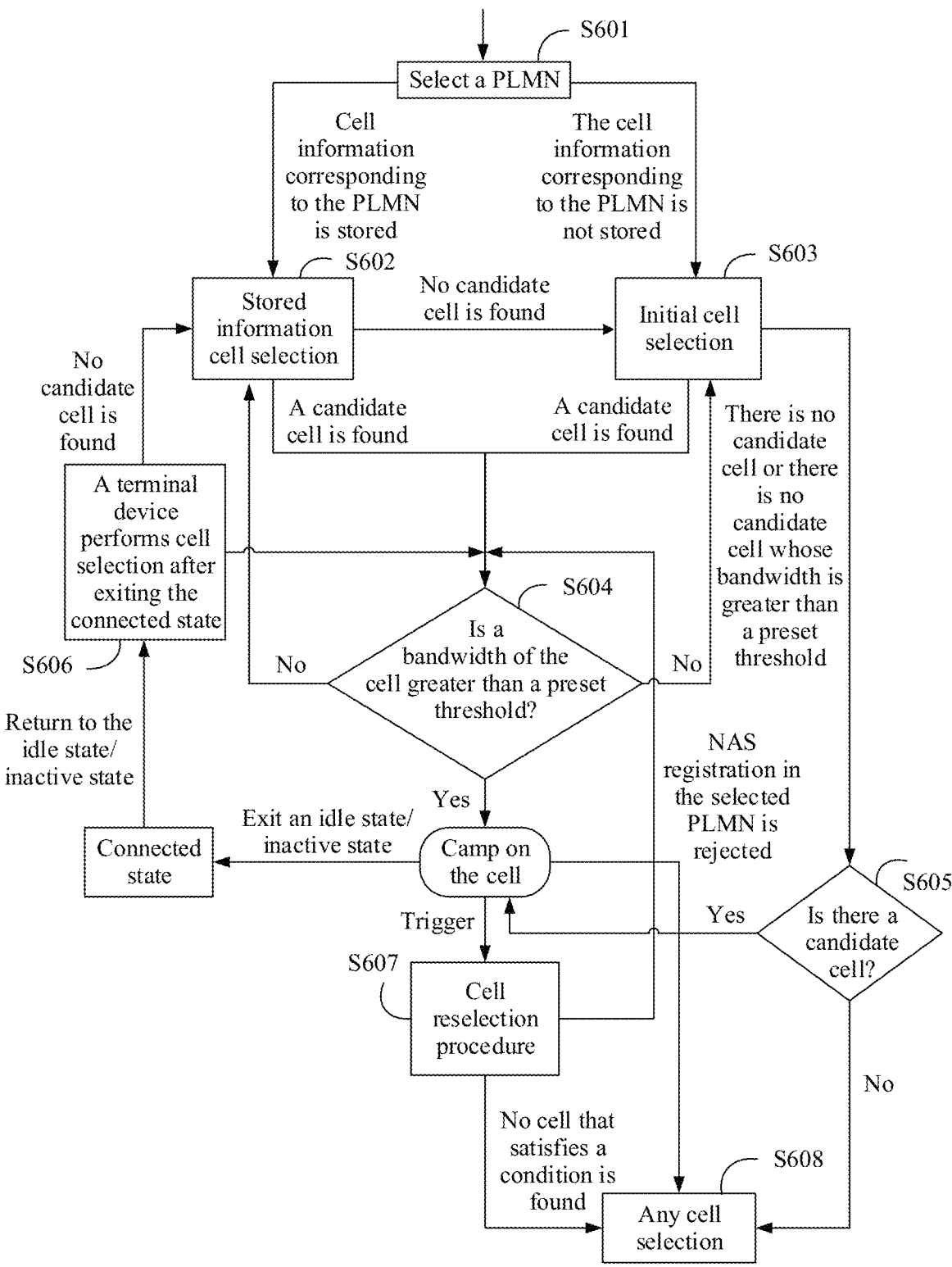
FIG. 6 is a schematic flowchart of a cell selection method and a cell reselection method according to another embodiment of this application.

FIG. 6 is a schematic flowchart of a cell selection and cell reselection method according to another embodiment of this application. FIG. 6 shows a detailed procedure of cell selection and cell reselection. As shown in FIG. 6, the method includes the following operations:

S601: A terminal device selects a PLMN.

For example, a NAS of the terminal device selects a network from a prestored PLMN list, and selects a PLMN. For example, the terminal device may select the PLMN from the PLMN list based on a priority order. After the PLMN is selected, the NAS of the terminal device may indicate, to an AS, a RAT related to the selected PLMN, and indicate the AS of the terminal device to perform a cell selection procedure. The AS of the terminal device performs, based on whether the terminal device stores cell information corresponding to the PLMN, a stored information cell selection procedure or an initial cell selection procedure. The cell information includes priori information.

S602: If the terminal device stores the cell information corresponding to the PLMN, the terminal device performs the stored information cell selection procedure.

The cell selection procedure is used to search for a candidate cell that satisfies a first preset condition. For example, the terminal device may search, based on frequency information that is of a cell on which the terminal device has previously camped and that is in the priori information, for a candidate cell that satisfies the first preset condition. In an embodiment of this application, if the terminal device does not find a candidate cell that satisfies the first preset condition according to the stored information cell selection procedure, the terminal device performs S603.

S603: If the terminal device does not store the cell information corresponding to the PLMN, or the terminal device does not find a candidate cell that satisfies the first preset condition in the stored information cell selection procedure, the terminal device performs the initial cell selection procedure.

The initial cell selection procedure includes performing a full-band search for a candidate cell that satisfies the first preset condition.

S604: If the terminal device finds a candidate cell that satisfies the first preset condition, the terminal device determines whether a bandwidth of the candidate cell is greater than a preset threshold.

If the terminal device finds the candidate cell that satisfies the preset condition according to S602 or S603, the terminal device determines whether the bandwidth of the candidate cell is greater than the preset threshold. The terminal device camps on the candidate cell if the bandwidth of the candidate cell is greater than the preset threshold. If the bandwidth of the candidate cell is less than the preset threshold, the terminal device returns to continue to perform the cell selection procedure in S602 or S603.

The terminal device may obtain bandwidth information of the candidate cell from a system message. For example, the bandwidth information of the candidate cell may be dl-Bandwidth (bandwidth) information in a MIB message in the system message.

In an embodiment of this application, when the bandwidth of the candidate cell is greater than the preset threshold, if NAS registration performed by the terminal device in the selected PLMN is rejected due to some causes, the terminal device may perform any cell selection procedure in operation S608.

S605: If the terminal device finds one or more candidate cells that satisfy the first preset condition in S603 and S604, but bandwidths of all the found candidate cells are less than or equal to the preset threshold, the terminal device selects a cell from the candidate cells and camps on the cell; or if the terminal device does not find a candidate cell that satisfies the first preset condition in S603 and S604, the terminal device performs the any cell selection procedure in S608.

S606: When returning from a connected state to an idle state or an inactive state, the terminal device may perform a cell selection procedure performed after the terminal device exits the connected state. The terminal device first searches for a previous cell on which the terminal device camps, determines whether the previous cell on which the terminal device camps satisfies the first preset condition, and performs S604. If the previous cell on which the terminal device camps does not satisfy the first preset condition, the terminal device performs the stored information cell selection procedure in S602.

For example, after camping on a cell, the terminal device exits an idle state and/or an inactive state, and is in a connected state. When returning from the connected state to the idle state and/or the inactive state, the terminal device may perform the cell selection procedure performed after the terminal device exits the connected state. In the cell selection procedure performed after the terminal device exits the connected state, the terminal device preferentially attempts to camp on the previous serving cell on which the terminal device camps; and if the terminal device cannot camp on the previous serving cell on which the terminal device camps, the terminal device searches for another cell, and attempts to camp on the another cell.

S607: After camping on a serving cell, the terminal device may trigger a cell reselection procedure when detecting a candidate cell that satisfies a cell reselection condition.

For the cell reselection condition, refer to the related descriptions about the cell reselection criterion the foregoing descriptions. Details are not described herein again. After finding the candidate cell that satisfies the cell reselection condition, the terminal device may perform operation S604 to determine whether to hand over from the source cell on which the terminal device camps to the candidate cell. If a bandwidth of the candidate cell is less than or equal to the preset threshold, the terminal device may end the cell reselection procedure, and camp on the source cell again. Alternatively, if the terminal device does not find a candidate cell that satisfies the reselection condition, the terminal device may perform the any cell selection procedure in S608.

S608: The terminal device performs the any cell selection procedure.

If the terminal device does not find a candidate cell that satisfies the first preset condition in the cell selection process, or does not find a cell that satisfies the cell reselection condition in the cell reselection process, or the terminal device finds a candidate cell that satisfies the first preset condition, but NAS registration is rejected, the terminal device may perform the any cell selection procedure. The any cell selection procedure may also be referred to as any cell search procedure, and is a process in which the terminal device attempts to camp on a restricted cell when the terminal device cannot obtain a normal service. For related content of the any cell search procedure, refer to the related descriptions in FIG. 3. Details are not described herein again.

Figure 7:
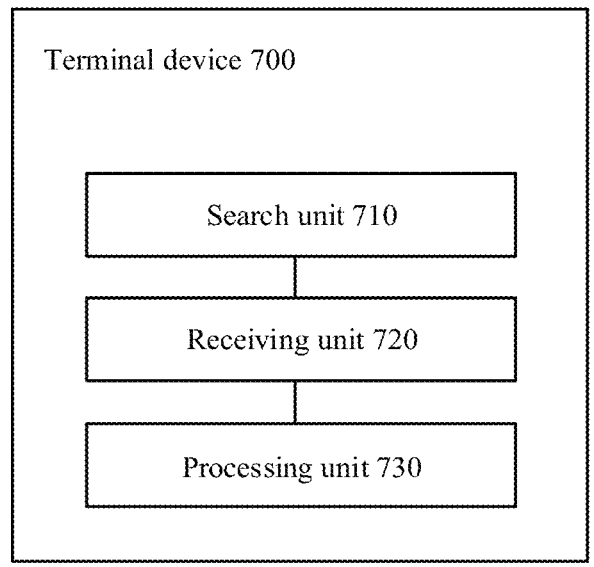
FIG. 7 is a schematic structural diagram of a terminal device according to an embodiment of this application.

FIG. 7 is a schematic structural diagram of a terminal device 700 according to an embodiment of this application. The terminal device 700 may be configured to perform the cell selection methods or operations performed by the terminal device in the method embodiments of this application. As shown in FIG. 7, the terminal device 700 includes a search unit 710, a receiving unit 720, and a processing unit 730.

The search unit 710 is configured to search for a first candidate cell. The receiving unit 720 is configured to receive a system message of the first candidate cell. The system message of the first candidate cell includes parameter information of the first candidate cell; bandwidth information of the first candidate cell, where the bandwidth information is used to indicate a bandwidth of the first candidate cell; and information used to indicate the following content: a PLMN of the first candidate cell is a PLMN selected by a non-access stratum (NAS), a PLMN of the first candidate cell is a registered PLMN, or a PLMN of the first candidate cell is a PLMN in an equivalent PLMN list; the first candidate cell is a cell that is not barred; and a TAI of the first candidate cell is not a TAI in a list of forbidden tracking areas for roaming. The processing unit 730 is configured to: determine a cell selection reception level value Srxlev and a cell selection quality value Squal of the first candidate cell based on cell measurement values and the parameter information of the first candidate cell, and determine that Srxlev>0 and Squal>0. The processing unit 730 is further configured to: when the bandwidth of the first candidate cell is greater than a preset threshold, determine that the terminal device is to camp on the first candidate cell.

Figure 8:
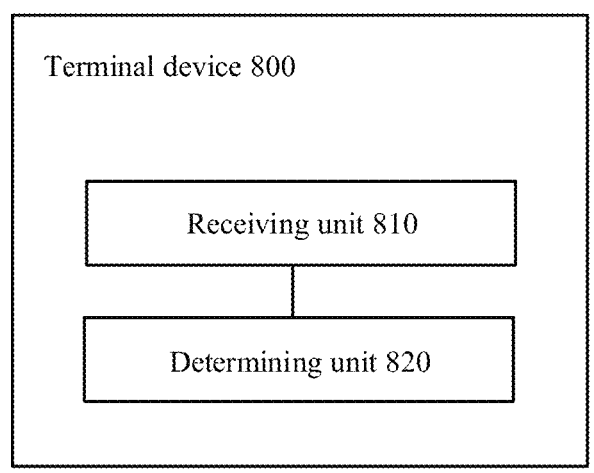
FIG. 8 is a schematic structural diagram of a terminal device according to another embodiment of this application.

FIG. 8 is a schematic structural diagram of a terminal device 800 according to an embodiment of this application. The terminal device 800 may be configured to perform the cell reselection methods or operations performed by the terminal device in the method embodiments of this application. As shown in FIG. 8, the terminal device 800 includes a receiving unit 810 and a determining unit 820.

The receiving unit 810 is configured to receive a system message of a serving cell on which the terminal device 800 camps. The system message includes neighboring cell information, and the neighboring cell information includes priority information and parameter information of a first candidate cell. The determining unit 820 is configured to determine, based on the priority information and the parameter information of the first candidate cell, that the first candidate cell satisfies a cell reselection condition. The receiving unit 810 is further configured to receive a system message of the first candidate cell. The system message of the first candidate cell includes bandwidth information of the first candidate cell, and the bandwidth information is used to indicate a bandwidth of the first candidate cell. The determining unit 820 is further configured to: when the bandwidth of the first candidate cell is greater than a preset threshold, determine that the terminal device is to hand over from the serving cell to the first candidate cell.

Figure 9:
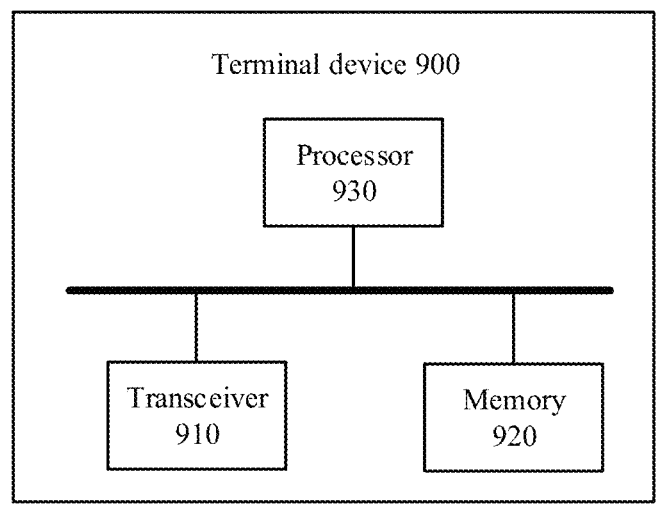
FIG. 9 is a schematic structural diagram of a terminal device according to another embodiment of this application.

FIG. 9 is a schematic structural diagram of a terminal device 900 according to another embodiment of this application. The terminal device 900 may be configured to perform the methods or operations performed by the terminal device in the method embodiments of this application. As shown in FIG. 9, the terminal device 900 includes:

a transceiver 910;
a memory 920, configured to store a program; and
a processor 930, configured to execute the program in the memory 920.

In one example, when the program is executed, the processor 930 is configured to: search for a first candidate cell; receive a system message of the first candidate cell by using the transceiver 910, where the system message of the first candidate cell includes parameter information of the first candidate cell; bandwidth information of the first candidate cell, where the bandwidth information is used to indicate a bandwidth of the first candidate cell; and information used to indicate the following content: a PLMN of the first candidate cell is a PLMN selected by a NAS, a PLMN of the first candidate cell is a registered PLMN, or a PLMN of the first candidate cell is a PLMN in an equivalent PLMN list; the first candidate cell is a cell that is not barred; and a TAI of the first candidate cell is not a TAI in a list of forbidden tracking areas for roaming; determine a cell selection reception level value Srxlev and a cell selection quality value Squal of the first candidate cell based on cell measurement values and the parameter information of the first candidate cell, and determine that Srxlev>0 and Squal>0; and when the bandwidth of the first candidate cell is greater than a preset threshold, determine that the terminal device is to camp on the first candidate cell.

In another example, when the program is executed, the processor 930 is configured to: receive, by using the transceiver 910, a system message of a serving cell on which the terminal device 900 camps, where the system message includes neighboring cell information, and the neighboring cell information includes priority information and parameter information of a first candidate cell; determine, based on the priority information and the parameter information of the first candidate cell, that the first candidate cell satisfies a cell reselection condition; receive, by using the transceiver 910, a system message of the first candidate cell, where the system message of the first candidate cell includes bandwidth information of the first candidate cell, and the bandwidth information is used to indicate a bandwidth of the first candidate cell; and when the bandwidth of the first candidate cell is greater than a preset threshold, determine that the terminal device is to hand over from the serving cell to the first candidate cell.

A person of ordinary skill in the art may be aware that, in combination with the examples described in the embodiments disclosed in this specification, units and algorithm operations may be implemented by electronic hardware, computer software, or a combination thereof. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

If the function is implemented in the form of a software functional unit and sold or used as an independent product, the function may be stored in a computer-readable storage medium. Based on such an understanding, the technical solutions of this application essentially, or the part contributing to a conventional technology, or some of the technical solutions may be implemented in a form of a software product. The computer software product is stored in a storage medium and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell selection method, comprising:
   searching, by a terminal device, for a first candidate cell;
   receiving, by the terminal device, a system message of the first candidate cell, wherein the system message of the first candidate cell comprises parameter information of the first candidate cell, bandwidth information of the first candidate cell, and information for indicating that a public land mobile network (PLMN) of the first candidate cell is a PLMN selected by a non-access stratum (NAS), a registered PLMN or a PLMN in an equivalent PLMN list, wherein the first candidate cell is not barred, and includes a tracking area identity (TAI) that is not in a list of forbidden tracking areas for roaming, and wherein the bandwidth information is downlink (dl)-bandwidth information in a master information block (MIB) message including one or more bandwidths of the first candidate cell;
   determining, by the terminal device, a cell selection reception level value (Srxlev) and a cell selection quality value (Squal) of the first candidate cell based on cell measurement values and the parameter information of the first candidate cell, and determining that Srxlev>0 and Squal>0; and
   when the bandwidth of the first candidate cell is greater than a preset threshold, camping, by the terminal device, on the first candidate cell;
   wherein when bandwidths of candidate cells that satisfy a first preset condition and that are found by the terminal device are less than or equal to the preset threshold, wherein the candidate cells that satisfy the first preset condition include the first candidate cell,
   determining, by the terminal device from the candidate cells that satisfy the first preset condition, a candidate cell on which the terminal device is to camp;
   wherein, for each of the candidate cells, the first preset condition comprises:
     a PLMN of a candidate cell is a PLMN selected by the NAS, a registered PLMN, or a PLMN in the equivalent PLMN list;
     the candidate cell is a cell that is not barred;
     a TAI of the candidate cell is not a TAI in the list of forbidden tracking areas for roaming; and
     Srxlev>0 and Squal>0.

2. The cell selection method according to claim 1, further comprising: when the bandwidth of the first candidate cell is less than or equal to the preset threshold, skipping, by the terminal device, camping on the first candidate cell.

3. The cell selection method according to claim 1, further comprising:
   when the bandwidth of the first candidate cell is less than or equal to the preset threshold, marking, by the terminal device, the first candidate cell as a cell with a lowest priority in a current radio access technology (RAT) or a cell with a lowest priority in all RATs supported by the terminal device.

4. The cell selection method according to claim 1, wherein the searching, by a terminal device, for a first candidate cell comprises:
   when the terminal device locally stores a priori message, searching, by the terminal device, for the first candidate cell based on the priori message, wherein the priori message is to indicate cell information of a cell on which the terminal device has previously camped.

5. The cell selection method according to claim 4, wherein the searching, by a terminal device, for a first candidate cell further comprises:
when the first candidate cell is not found based on the priori message, determining, by the terminal device, the first candidate cell through a full-band search.

6. The cell selection method according to claim 1, wherein the searching, by a terminal device, for a first candidate cell comprises:
when the terminal device does not locally store a priori message, performing, by the terminal device, a full-band search for the first candidate cell, wherein the priori message is to indicate cell information of a cell on which the terminal device has previously camped.

7. A cell reselection method, comprising:
receiving, by a terminal device, a system message of a serving cell on which the terminal device camps, wherein the system message comprises neighboring cell information, and wherein the neighboring cell information comprises priority information and parameter information of a first candidate cell;
determining, by the terminal device based on the priority information and the parameter information of the first candidate cell, that the first candidate cell satisfies a cell reselection condition, wherein the determining, by the terminal device based on the priority information and the parameter information of the first candidate cell, that the first candidate cell satisfies the cell reselection condition comprises:
determining, by the terminal device based on the priority information of the first candidate cell, that a priority of the first candidate cell is less than that of the serving cell;
determining, by the terminal device, a cell selection reception level value (Srxlev) of the first candidate cell based on cell measurement values of the first candidate cell and the parameter information of the first candidate cell;
determining, by the terminal device, that within a preset time period, Srxlev of the first candidate cell is greater than a second threshold, and Srxlev of the serving cell is less than a third threshold; and
determining that the terminal device has resided in the serving cell for more than one second;
receiving, by the terminal device, a system message of the first candidate cell, wherein the system message of the first candidate cell comprises bandwidth information of the first candidate cell, and wherein the bandwidth information is downlink (dl)-bandwidth information in a master information block (MIB) message including one or more bandwidths of the first candidate cell; and
when the bandwidth of the first candidate cell is greater than a preset threshold, handing over, by the terminal device, from the serving cell to the first candidate cell.

8. The cell reselection method according to claim 7, further comprising:
when the bandwidth of the first candidate cell is less than or equal to the preset threshold, determining, by the terminal device, to continue to camp on the current serving cell.

9. The cell reselection method according to claim 7, wherein when the bandwidth of the first candidate cell is less than or equal to the preset threshold, marking, by the terminal device, the first candidate cell as a barred cell.

10. The cell reselection method according to claim 7, wherein the determining, by the terminal device based on the priority information and the parameter information of the first candidate cell, that the first candidate cell satisfies the a cell reselection condition comprises:
determining, by the terminal device based on the priority information of the first candidate cell, that a priority of the first candidate cell is greater than that of the serving cell;
determining, by the terminal device, a cell selection reception level value (Srxlev) of the first candidate cell based on cell measurement values of the first candidate cell and the parameter information of the first candidate cell;
determining, by the terminal device, that Srxlev of the first candidate cell is greater than a first threshold within a preset time period; and
determining, by the terminal device, that the terminal device has resided in the serving cell for more than one second.

11. The method according to claim 7, wherein the determining, by the terminal device based on the priority information and the parameter information of the first candidate cell, that the first candidate cell satisfies the a cell reselection condition comprises:
determining, by the terminal device based on the priority information of the first candidate cell, that a priority of the first candidate cell is equal to that of the serving cell;
determining, by the terminal device, a cell-ranking criterion Rn for the first candidate cell based on the parameter information of the first candidate cell; and
determining, by the terminal device, that Rn is greater than Rs, wherein Rs represents a cell-ranking criterion for the serving cell.

12. A chip of a terminal device, comprising:
a processor, configured to invoke a computer program from a memory, wherein when the computer program is executed, a terminal device installed with the chip is enabled to perform operations comprising:
searching for a first candidate cell;
receiving a system message of the first candidate cell, wherein the system message of the first candidate cell comprises parameter information of the first candidate cell, bandwidth information of the first candidate cell, and information for indicating that a public land mobile network (PLMN) of the first candidate cell is a PLMN selected by a non-access stratum (NAS), a registered PLMN, or a PLMN in an equivalent PLMN list, wherein the first candidate cell is a cell that is not barred and includes a tracking area identity (TAI) that is not a TAI in a list of forbidden tracking areas for roaming, and wherein the bandwidth information is downlink (dl)-bandwidth information in a master information block (MIB) message including one or more bandwidths of the first candidate cell;
determining a cell selection reception level value (Srxlev) and a cell selection quality value (Squal) of the first candidate cell based on cell measurement values and the parameter information of the first candidate cell, and determining that Srxlev>0 and Squal>0; and
when the bandwidth of the first candidate cell is greater than a preset threshold, determining to camp on the first candidate cell;
when bandwidths of candidate cells that satisfy a first preset condition and that are found by the terminal device are less than or equal to the preset threshold, wherein the candidate cells that satisfy the first preset condition include the first candidate cell, determining, from the candidate cells that satisfy the first preset condition, a candidate cell on which the terminal device is to camp;

wherein, for each of the candidate cells, the first preset condition comprises:

a PLMN of a candidate cell is a PLMN selected by the NAS, a registered PLMN, or a PLMN in the equivalent PLMN list;

the candidate cell is a cell that is not barred;

a TAI of the candidate cell is not a TAI in the list of forbidden tracking areas for roaming; and Srxlev>0 and Squal>0.

13. The chip according to claim 12, the operations further comprising: when the bandwidth of the first candidate cell is less than or equal to the preset threshold, determining not to camp on the first candidate cell.

14. The chip according to claim 12, the operations further comprising:

when the bandwidth of the first candidate cell is less than or equal to the preset threshold, marking the first candidate cell as a cell with a lowest priority in a current radio access technology (RAT) or a cell with a lowest priority in all RATs supported by the terminal device.

15. The chip according to claim 12, wherein the searching for the first candidate cell further comprises:

when the terminal device locally stores a priori message, searching for the first candidate cell based on the priori message, wherein the priori message is to indicate cell information of a cell on which the terminal device has previously camped.

16. The chip according to claim 15, wherein the searching for the first candidate cell further comprises: when the first candidate cell is not found based on the priori message, determining the first candidate cell through a full-band search.

17. The chip according to claim 12, wherein the searching for the first candidate cell further comprises:

when the terminal device does not locally store a priori message, performing a full-band search for the first candidate cell, wherein the priori message is to indicate cell information of a cell on which the terminal device has previously camped.

\* \* \* \* \*

UNITED STATES PATENT AND TRADEMARK OFFICE
CERTIFICATE OF CORRECTION

PATENT NO. : 12,101,675 B2
APPLICATION NO. : 17/594493
DATED : September 24, 2024
INVENTOR(S) : Yong Li and Zhiyuan Hou It is certified that error appears in the above-identified patent and that said Letters Patent is hereby corrected as shown below:

In the Claims

In Claim 11, Column 24, Line 22, delete "satisfies the a cell reselection" and insert --satisfies the cell reselection--.

Signed and Sealed this
Third Day of December, 2024

Katherine Kelly Vidal
Director of the United States Patent and Trademark Office